（12) United States Patent
Baccouche et al.

(10) Patent No.: US 9,102,362 B2
(45) Date of Patent: Aug. 11, 2015

(54) VEHICLE UNDERBODY STRUCTURE

(71) Applicant: Ford Global Technologies, LLC, Dearborn, MI (US)

(72) Inventors: Ridha Baccouche, Ann Arbor, MI (US); Rahul Arora, Royal Oak, MI (US); Saeed David Barbat, Novi, MI (US); James Chih Cheng, Troy, MI (US); Srinivasan Sundararajan, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 192 days.

(21) Appl. No.: 13/897,871

(22) Filed: May 20, 2013

(65) Prior Publication Data

US 2014/0338996 A1    Nov. 20, 2014

(51) Int. Cl.
| | | |
|---|---|---|
| B62D 21/00 | (2006.01) | |
| B62D 21/15 | (2006.01) | |
| B62D 21/02 | (2006.01) | |
| B62D 25/20 | (2006.01) | |
| B60K 1/04 | (2006.01) | |

(52) U.S. Cl.
CPC .............. *B62D 21/157* (2013.01); *B60K 1/04* (2013.01); *B62D 21/02* (2013.01); *B62D 21/15* (2013.01); *B62D 21/152* (2013.01); *B62D 25/2036* (2013.01); *B60K 2001/0438* (2013.01); *B60Y 2306/01* (2013.01)

(58) Field of Classification Search
CPC .. B60K 1/04; B60K 2001/0438; B62D 21/02; B62D 21/15; B62D 21/152; B60Y 2306/01
USPC ........ 280/781, 784, 311, 193.07, 203.01, 204
See application file for complete search history.

(56) References Cited

U.S. PATENT DOCUMENTS

| | | | |
|---|---|---|---|
| 5,496,067 | A | 3/1996 | Stoll et al. |
| 5,681,057 | A | 10/1997 | Whirley et al. |
| 6,402,229 | B1 | 6/2002 | Suganuma |
| 7,427,093 | B2 | 9/2008 | Watanabe et al. |
| 7,568,755 | B2 | 8/2009 | Imada et al. |

(Continued)

FOREIGN PATENT DOCUMENTS

| | | |
|---|---|---|
| DE | 102011012115 | 11/2011 |
| JP | 0648185 | 2/1994 |

(Continued)

OTHER PUBLICATIONS

Nick Bunckley. "G.M. to Reinforce Battery in its Hybrid Car, The Volt." New York Times Business Day. Published Jan. 5, 2012. Source: http://www.nytimes.com/2012/01/06/business/gm-to-reinforce-battery-in-hybrid-car.html.
Steel Market Development Institute. "Future Steel Vehicle Overview Report." Published May 2011. Source: http://www.autosteel.org.

*Primary Examiner* — Faye M Fleming
(74) *Attorney, Agent, or Firm* — Raymond Coppiellie; Price Heneveld, LLP

(57) ABSTRACT

A vehicle underbody structure includes a pair of longitudinal rails. A tunnel is spaced between the longitudinal rails. A number of nonintrusive support members span between the tunnel and the longitudinal rails. The support members have a hoop shape that surrounds an enclosed area. The hoop shape of the nonintrusive support members is adapted to deform into the enclosed area for preventing a side impact force from damaging the tunnel.

19 Claims, 10 Drawing Sheets

(56) References Cited

U.S. PATENT DOCUMENTS

| | | | |
|---|---|---|---|
| 7,836,999 B2 * | 11/2010 | Kato | 180/312 |
| 8,602,454 B1 * | 12/2013 | Baccouche et al. | 280/781 |
| 2007/0007060 A1 * | 1/2007 | Ono et al. | 180/65.3 |
| 2008/0283317 A1 | 11/2008 | Wagner et al. | |
| 2012/0248867 A1 * | 10/2012 | Yoshida | 307/9.1 |

FOREIGN PATENT DOCUMENTS

| | | |
|---|---|---|
| JP | 2004175301 | 6/2004 |
| JP | 2010036902 | 2/2010 |

* cited by examiner

VEHICLE UNDERBODY STRUCTURE

FIELD OF THE INVENTION

The present invention generally relates to an underbody structure for a vehicle, and more specifically to a vehicle underbody structure configured to support and protect a battery.

BACKGROUND OF THE INVENTION

As large battery cells are more frequently included as a power source for automobiles, it is desired to provide a protective structure for a battery that can also position the battery centrally within the vehicle for more efficient weight distribution. Traditional underbody structures are made primarily from sled runners and cross members that extend orthogonally between the runners to form ladder type underbody structures. These traditional underbody structures put packaging limitations on the size of individual battery cells and the potential locations and arrangements of battery cells that may be incorporated into the underbody structure. Furthermore, traditional cross members running orthogonally between opposing rocker rails tend to transmit side impact loads along the cross members and into any intersecting battery casing, such as batteries housed within a drive shaft tunnel that intersects with the cross members.

SUMMARY OF THE INVENTION

According to one aspect of the present invention, a vehicle underbody structure includes a rail and a battery spaced inward from the rail. A nonintrusive support member spans between the battery and the rail for absorbing a side impact force. The support member includes a longitudinal section that borders a side region of the battery and a pair of lateral sections that angle outward from spaced locations on the longitudinal section to adjoin proximate the rail, defining an enclosed area.

According to another aspect of the present invention, a vehicle underbody structure includes a pair of longitudinal rails. A tunnel is spaced between the longitudinal rails. A nonintrusive support member spans between the tunnel and one of the longitudinal rails and has a hoop shape that surrounds an enclosed area. The hoop shape of the nonintrusive support member is adapted to deform into the enclosed area for preventing a side impact force from damaging the tunnel.

According to yet another aspect of the present invention, a vehicle underbody structure includes first and second rails extending longitudinally. A housing is spaced between the first and second rails, and a battery is disposed within the housing. A first pair of support members span between the housing and the first rail. A second pair of support members span between the housing and the second rail. The first and second pairs of support members each include a separate hoop shape with a central opening for absorbing a side impact force.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 2A is a top perspective view of the underbody structure;

DETAILED DESCRIPTION OF THE PREFERRED EMBODIMENTS

Figure 1:
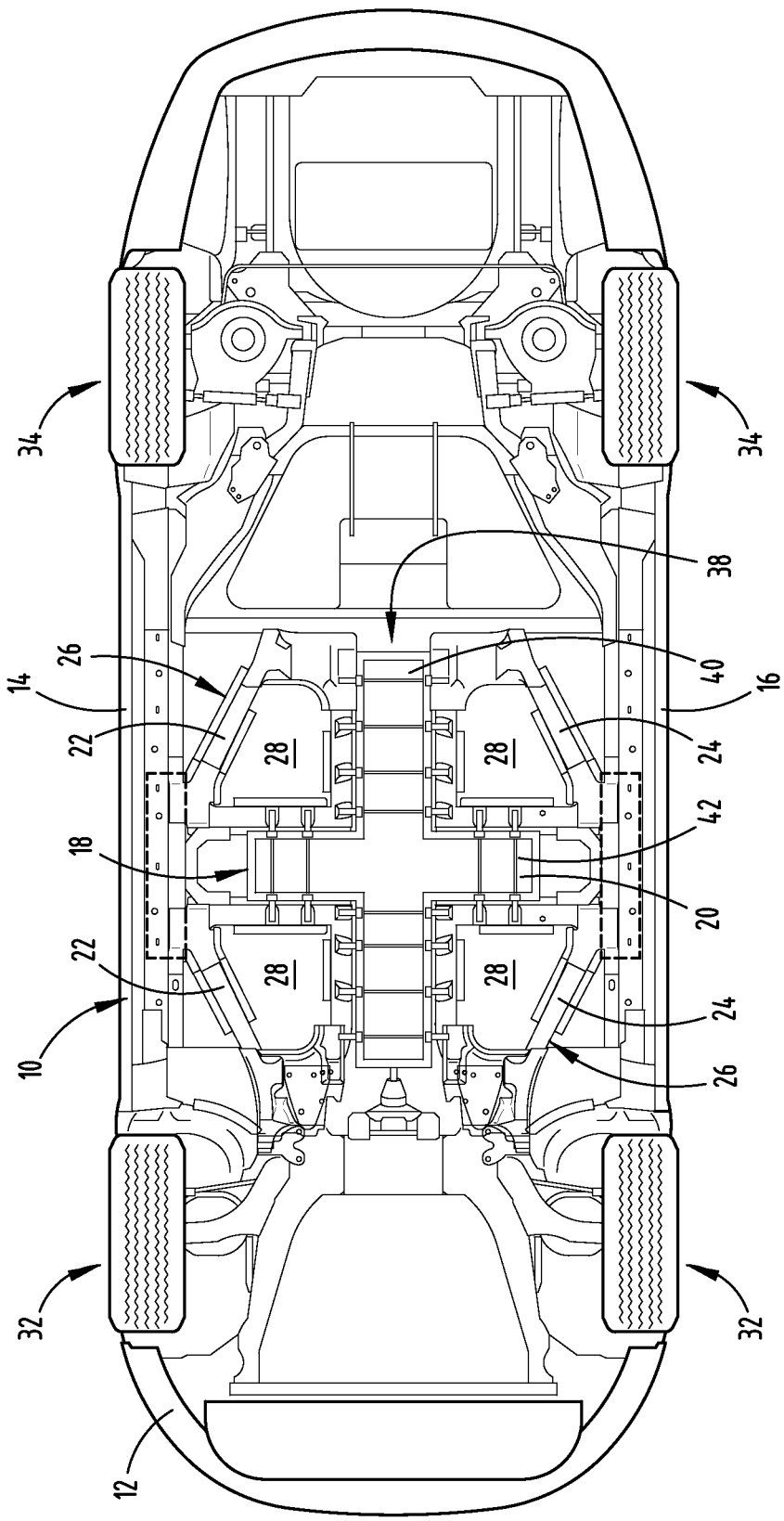
FIG. 1 is a bottom plan view of a vehicle having one embodiment of an underbody structure of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiment illustrated in FIGS. 1-10, reference numeral 10 generally designates an underbody structure for a vehicle 12 that includes a first longitudinal rail 14 and a second longitudinal rail 16 extending longitudinally in generally parallel alignment. A housing 18 is spaced between the first and second rails 14, 16, and a battery 20 is disposed within the housing 18. A first pair of support members 22 spans between the housing 18 and the first rail 14. A second pair of support members 24 span between the housing 18 and the second rail 16. The first and second pairs of support members 22, 24 each include a separate hoop shape 26 with a central opening 28 for absorbing a side impact force 30.

Referring now to FIG. 1, the underbody structure 10 of the vehicle 12 is a portion of the vehicle frame that spans longitudinally between a front set of wheels 32 and a rear set of wheels 34. More specifically, the underbody structure 10 includes the first and second longitudinal rails 14, 16 that each extend longitudinally between the front set of wheels 32 and the rear set of wheels 34. It is conceivable that the first and second rails 14, 16 may extend beyond the front or rear sets of wheels 32, 34 to form fender rails or to connect with a front or rear bumper. Likewise, it is contemplated that the first and second rails 14, 16 may constitute a segmented portion of the frame between the front and rear wheels. Further, as generally understood in the art, the first and second longitudinal rails 14, 16 may also be referred to as rocker rails or rockers.

The housing 18, in the embodiment illustrated in FIG. 1, is spaced centrally between the first and second rails 14, 16 and includes a tunnel portion 38 that extends longitudinally along the underbody structure 10 of the vehicle 12 in parallel alignment with the first and second rails 14, 16. The battery 20 is disposed within the housing 18 such that a longitudinal portion 40 of the battery 20 extends centrally within the tunnel portion 38 and is centrally positioned between the first and second longitudinal rails 14, 16. A lateral portion 42 of the battery 20 extends orthogonally from opposing sides of the longitudinal portion 40 of the battery 20, forming a cross shape that is generally centered between the rails 14, 16 and the front and rear wheels 32, 34. The tunnel portion 38, in other embodiments, may additionally or alternatively be used to house a driveshaft that operates to transfer rotational power to the rear set of wheels 34 when an engine is located in the front portion of the vehicle 12, and likewise, may be used to transmit rotational power to the front set of wheels 32 when the engine of the vehicle 12 is located in a rear portion of the vehicle 12.

Figure 2:
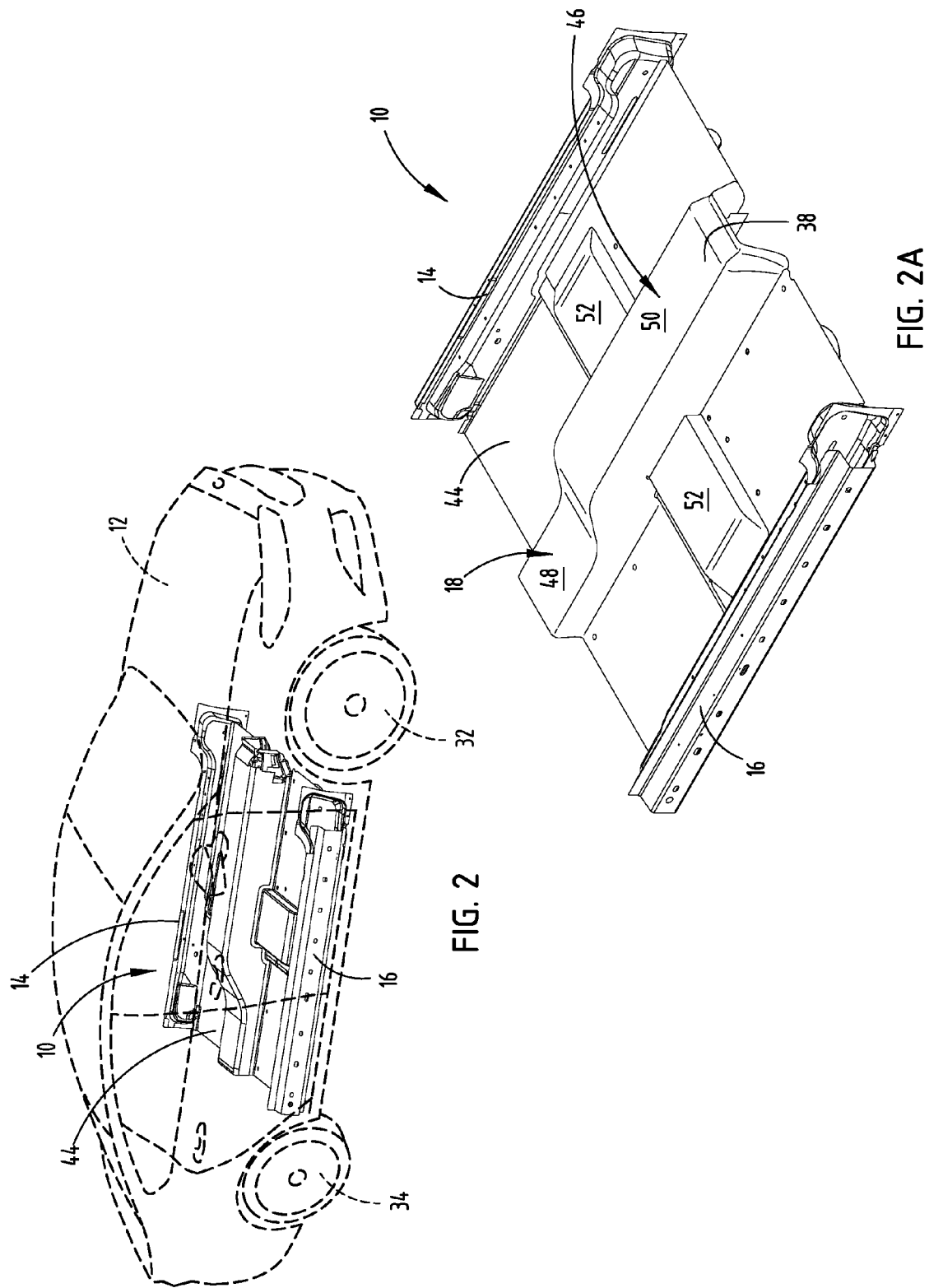
FIG. 2 is a top perspective view of the vehicle, showing the underbody structure.

As shown in FIG. 2, a top surface of the underbody structure 10 is defined by a floor panel 44 that extends laterally between the first and second longitudinal rails 14, 16 to provide a support surface for an occupant within the vehicle 12. It is understood that the floor panel 44 may be a single integral piece or a number of separate pieces that together form the support surface of the vehicle floor. The support surface may also conceivably be used to support interior components of the vehicle 12 such as seating assemblies, a center console, an instrument panel, and other interior components, as generally understood by one having ordinary skill in the art. The floor panel 44, as shown in FIG. 2A, includes a raised central area 46 that defines an upper region of the tunnel portion 38 of the housing 18. The raised central area 46 includes a rearward area 48 of the tunnel portion 38 that ramps upward to a forward area 50 of the tunnel portion 38 that has a higher elevation that the rearward area 48 and a similarly horizontal surface. Further, the floor panel 44 includes lateral raised portions 52 that protrude upward from opposing sides of the tunnel portion 38 proximate a middle area of the floor panel 44 to conform to the lateral portions 42 of the battery 20 (FIG. 1) and to further define an upper region of the housing 18. The lateral raised portions 52 are less elevated than the tunnel portion 38 to allow packaging area for interior components, such as seating assemblies. However, it is contemplated that the lateral raised portions 52 may be more or alternatively elevated from the tunnel portion 38.

Figure 3:
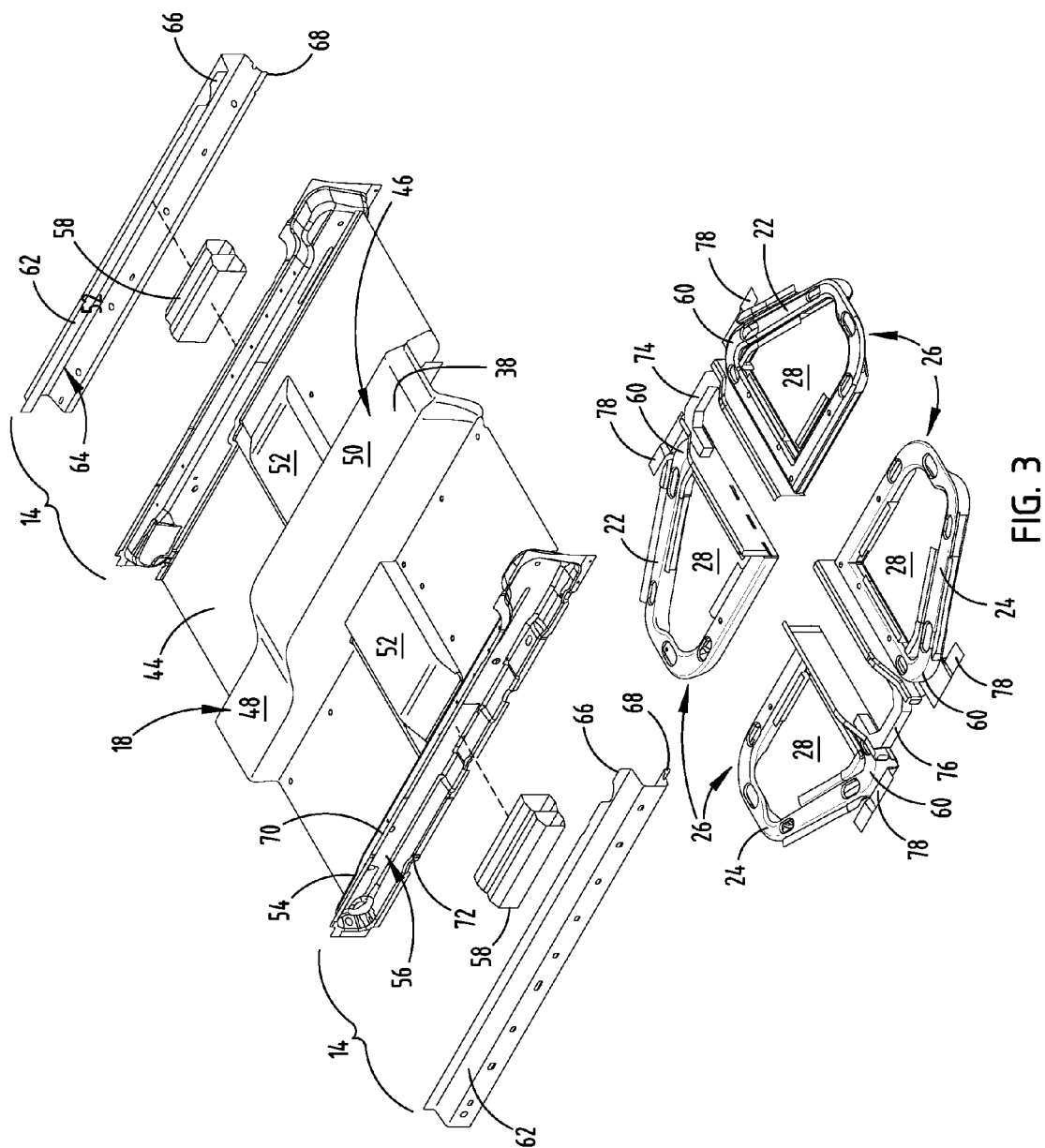
FIG. 3 is a top perspective view of the underbody structure.

Referring now to FIG. 3, the first and second longitudinal rails 14, 16 each include an inside rail member 54 having a cavity 56 facing laterally outward. The cavity 56 on the inside rail member 54 includes a C-shaped cross section. A crash element 58 is coupled within the cavity 56 of each inside rail member 56 proximate the lateral raised portions 52 of the floor panel 44, and accordingly, the lateral portions 42 of the battery 20. The crash elements 58 have a length that spans between outside portions 60 of the first and second pairs of support members 22, 24 that reside beneath the vehicle floor. An outside rail member 62 has an inward facing cavity 64 and couples with the inside rail member 54 to enclose the crash elements 58 and thereby form the first and second longitudinal rails 14, 16 of the embodiment illustrated in FIG. 2A. Similar to the inside rail member 54, the outside rail member 62 has a C-shaped cross-section configured such that an upper flange 66 and a lower flange 68 of the outside rail members couple with an upper flange 70 and lower flange 72 of the inside rail members 54, creating a hollow interior portion for the crash element 58 to be secured. Accordingly, the crash elements 58 are positioned to reinforce the first and second rails 14, 16 proximate the middle longitudinal area of the floor panel 44 to provide added impact absorption, as explained in more detail below.

Figure 3A:
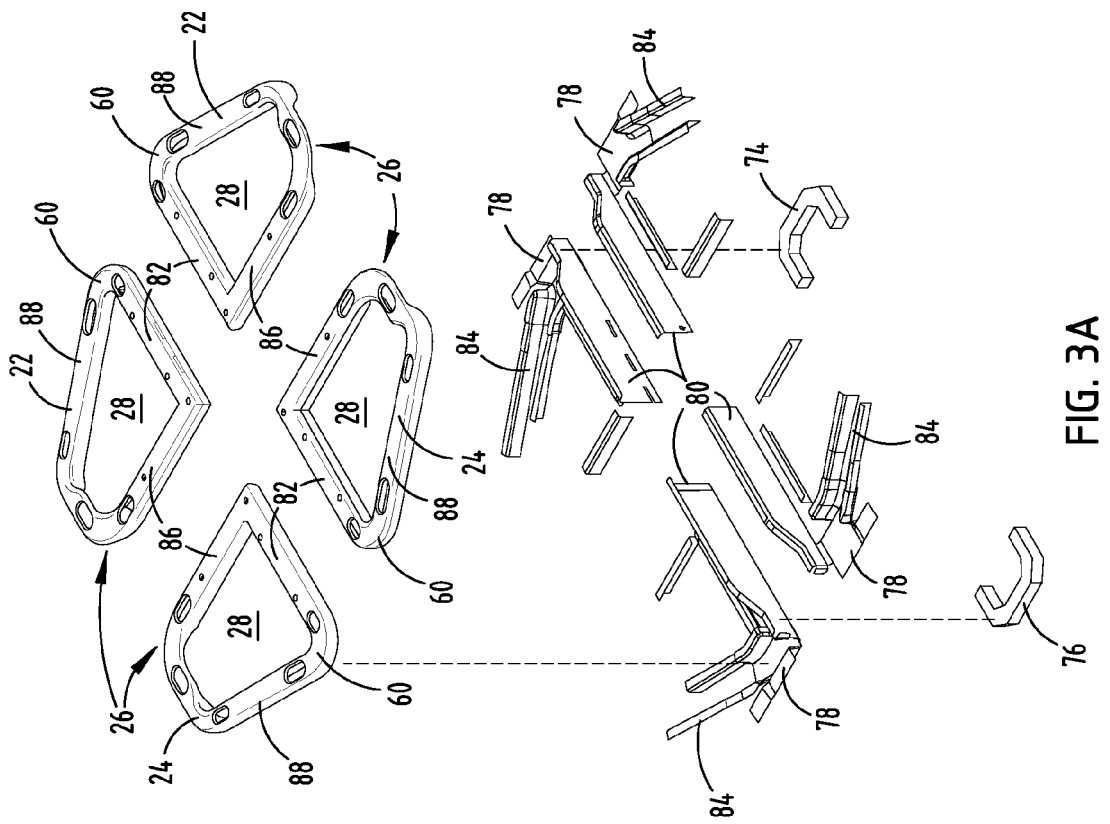
FIG. 3A is an exploded top perspective view of two pairs of nonintrusive support members of the underbody structure.

As further illustrated in FIGS. 3-3A, the first and second pairs of support members 22, 24 are positioned to span between the tunnel portion 38 of the housing 18 and the first and second longitudinal rails 14, 16, respectively. The four support members 22, 24 are laterally spaced on opposing sides of the battery 20 and longitudinally spaced on opposing sides of the lateral raised portions 52 on the vehicle floor panel 44. A first bridging element 74 and a second bridging element 76 are coupled with the first and second rails 14, 16, respectively, to maintain the longitudinal spacing between the pairs of support members 22, 24 about the lateral raised portions 52. More specifically, the bridging elements 74, 76 span between outside corner brackets 78 that are coupled with the outside portion 60 of each support member 22, 24. As shown in FIG. 3A, the outside corner brackets 78 have a laterally extending wall 80 that divides lateral sections 82 of the support members from the lateral portions 42 of the battery 20. The laterally extending walls 80 of the outside corner brackets 78 couple within and along an edge of the lateral raised portions 52 of the floor panel 44. The corner brackets 78 also include an angled channel 84 that extends at an alternative lateral direction, approximately forty-five degrees away from the longitudinal rails 14, 16 toward the tunnel 38. Accordingly, the outside corner brackets 78 stabilize the support members 22, 24 and provide additional surfaces for the support members 22, 24 to attach to the longitudinal rails 14, 16 and the bridging elements 74, 76.

Figure 4:
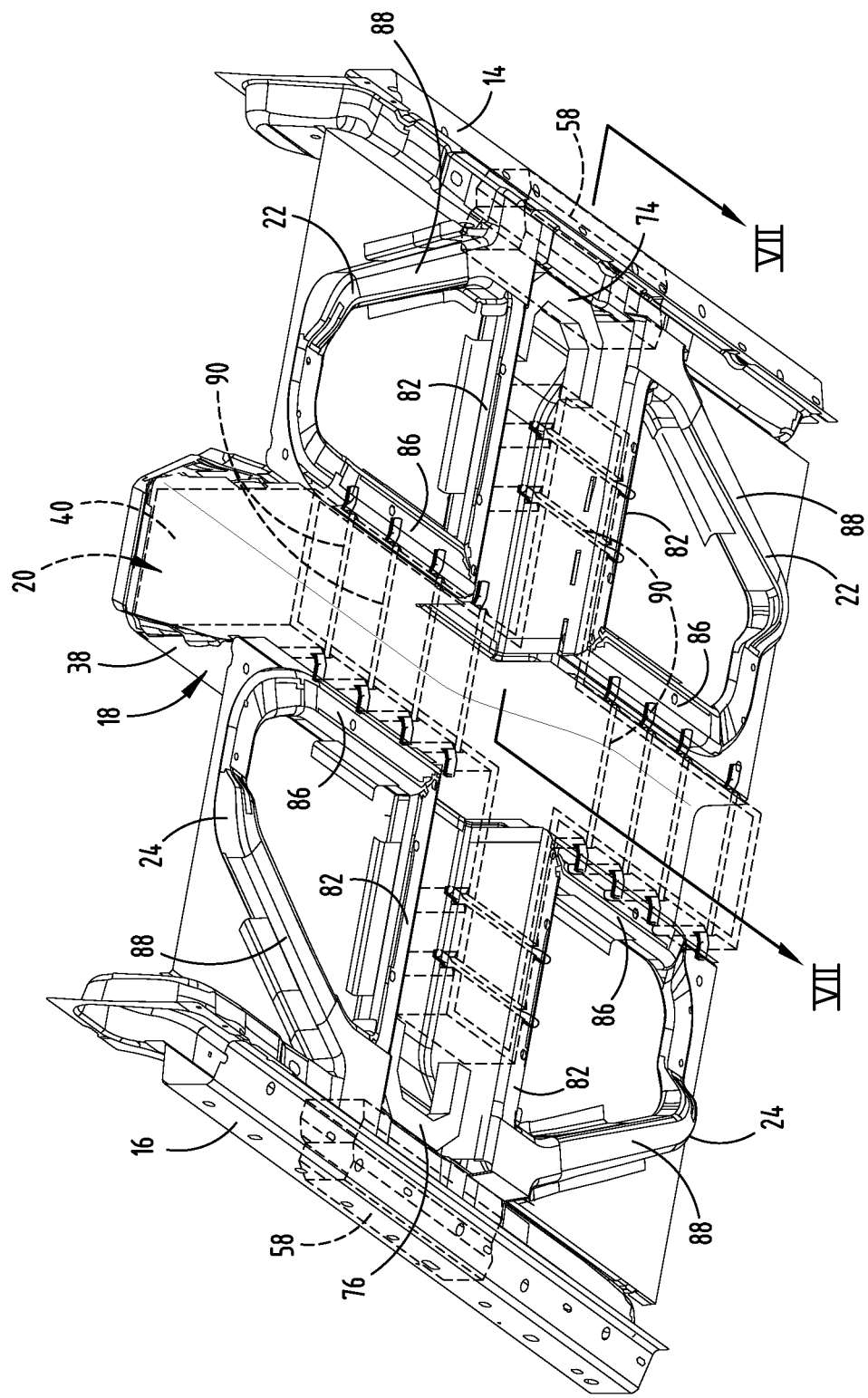
FIG. 4 is a bottom perspective view of the underbody structure.

In the embodiment illustrated in FIG. 4, the longitudinal portion 40 of the battery 20 is disposed within the tunnel portion 38 of the housing 18 and the lateral portions 42 of the battery 20 is disposed partially within and beneath the lateral raised portions 52 of the floor panel 44. The support members 22, 24 have an upper surface that couples with the floor panel 44 to provide support thereto. Further, the support members 22, 24 each include a longitudinal section 86 that borders a side region of the longitudinal portion 40 of the battery 20. The support members 22, 24 also each include a pair of lateral sections that angle outward from opposing ends of the longitudinal sections 86 and adjoin at the outside corner bracket 78 to define an enclosed hoop shape 26. An inside lateral section 82 of the support member borders the lateral portion 42 of the battery 20 that extends orthogonally outward from the longitudinal section 86 of the support member. An angled lateral section 88 of the support member is coupled within the angled channel 84 of the outside bracket 78. Accordingly, the longitudinal section 86 and the inside lateral section 82 of the support members 22, 24 border the battery 20 to prevent any intrusive feature on the support members 22, 24 that may pierce the battery 20 upon a side impact. However, it is contemplated that the support members 22, 24 may be formed with various alternative geometric configurations, such as circular shapes, oval shapes, and other conceivable shapes varying from the illustrated embodiment.

As further illustrated in FIG. 4, a number of connection elements 90 span across and the battery 20 between adjacent support members 22, 24 to provide vertical support to the battery 20 and couple the battery 20 with the support members 22, 24. The connection elements 90 each include an elongated body coupled with the battery 20 and opposing ends that couple with the adjacent support members 22, 24. It is contemplated that the connection elements 90 may be integrally formed with the battery 20 or otherwise coupled with the battery 20. It is also conceivable that an alternative means may be employed from the connection elements 90 to attach the battery 20 to the underbody structure 10, such as by attachment of the battery 20 to the floor panel 44.

Figure 4A:
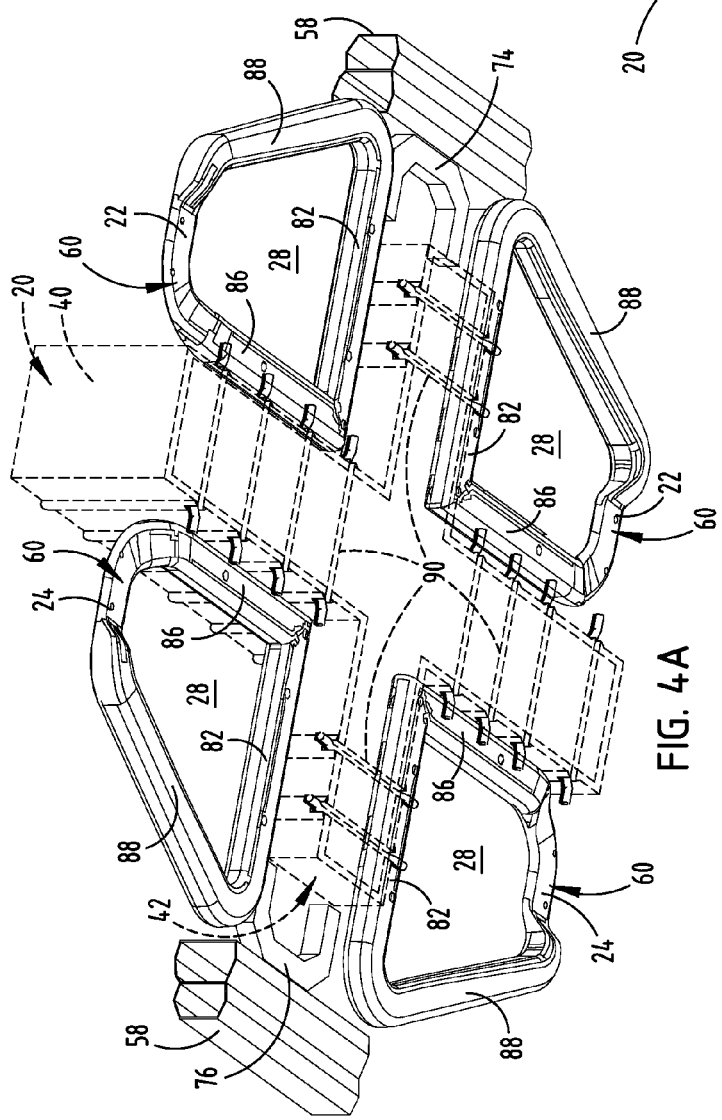
FIG. 4A is a bottom perspective view of the underbody structure, showing the support members, bridging elements, and crash elements.

The support members 22, 24, as shown in FIG. 4A, are spaced around the battery 20 and each provide a consistent surface in alignment with the side surface of the battery 20 to create a large amount of surface area aligned to contact the support members 22, 24 with the battery 20, which allows force to be distributed by the support members 22, 24 over a large surface of the battery 20 or the housing 18, and thereby prevents any single intrusive point of contact between the support members 22, 24 and the battery 20 to receive the entire force, which could result a piercing to the battery 20. Accordingly, the configuration of the support members 22, 24 prevents intrusion into the battery 20 or the tunnel portion 38 of the housing 18. Further, the bridging elements 74, 76 and the crash elements 58 are arranged proximate the outside portions 60 of the support members 22, 24 and each span between the outside portions 60 of each pair of support members 22, 24 to distribute and absorb any side impact forces, as explained in more detail below.

Figure 5:
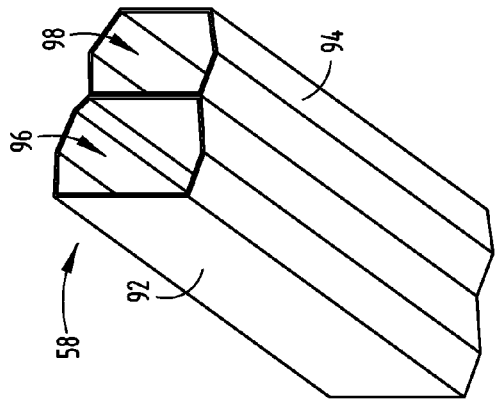
FIG. 5 is a crash element of the underbody structure, as shown in FIG. 4A.

With regard to one embodiment of the crash element 58, as shown in FIG. 5, an inside tube member 92 is coupled with an outside tube member 94 to form two separate crush chambers. The inside tube member 92 surrounds a first crush chamber 96 and includes a larger interior volume than a second crush chamber 98 of the outside tube member 94. Accordingly, the crash element 58 is designed to deform upon receiving a side impact force, such that both the first and second crush chambers 96, 98 collapse to absorb the force. With respect to the order of deformation, it is contemplated that the second crush chamber 98 of the outside tube member 94 may begin to collapse before or after the first crush chamber 96 begins to collapse. The position of the crash element 85, as shown in FIG. 4, is designed to distribute the side impact force to both outside corner brackets 78, proximate the outside portions 60 of the support members 22, 24. As a whole, the crash element 58 is adapted to absorb and distribute at least some of the side impact force before the side impact force substantially interacts with the support members 22, 24 or other more inboard components of the underbody structure 10.

Figure 6:
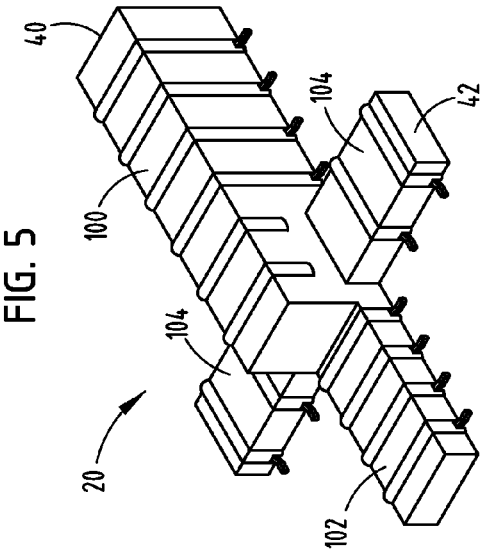
FIG. 6 is a top perspective view of a battery.

As shown in FIG. 6, the battery 20 of the illustrated embodiment is designed with a forward cell 100 having a large height and a longitudinal length extending from a front of the battery 20 beyond the lateral portion 42 of the battery 20. The longitudinal portion 40 of the battery 20 also includes a rear cell 102 having a shorter height than the forward cell 100. The lateral portions 42 of the battery 20 each include a lateral cell 104 that has approximately the same size as the rearward cell 102. The lateral cells 104 extend orthogonally from the forward cell 100 to define, along with the rearward cell 102, a cross shape that is configured to fit within the tunnel portion 38 and the lateral raised portions 52 of the protective housing 18 (FIG. 3). However, it is understood that the battery 20 may assume various alternative shapes and orientations from the embodiment illustrated.

Figure 7:
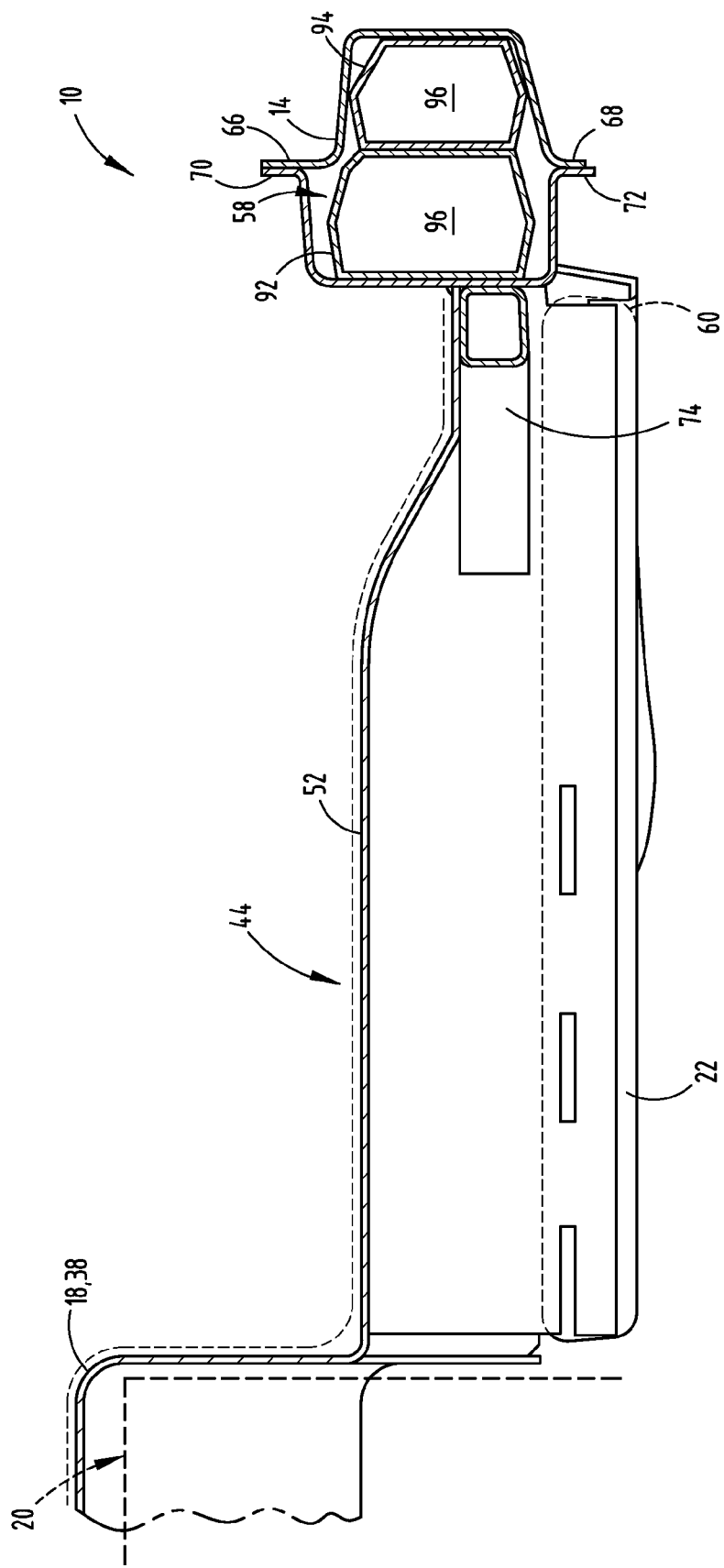
FIG. 7 is a cross-sectional side view of the underbody structure taken at line VII of FIG. 4.

Referring now to FIG. 7, the support member 22 is shown laterally spaced away from the battery 20 by a distance of approximately 2.5 mm; however, it is contemplated that a larger distance may be employed. The interior hollow portion of the rail 14 is shown about the crash element 58, wherein upon receiving the side impact force to the outside of the lateral rail 14, the forces are laterally transmitted through both chambers 96, 98 of the crash element 58. The side impact force, if not fully absorbed, is further transmitted to the bridging element 74 and support member 22. The bridging element 74 acts to further distributed the side impact force to both support members 22 on a single side of the vehicle 12, thereby avoiding a single support member 22 from absorbing the entire side impact force. The support members 22 then act to absorb the remainder of the side impact force, generally deforming inward to the enclosed area 28, defined by the central opening in the support member 22.

Figure 8:
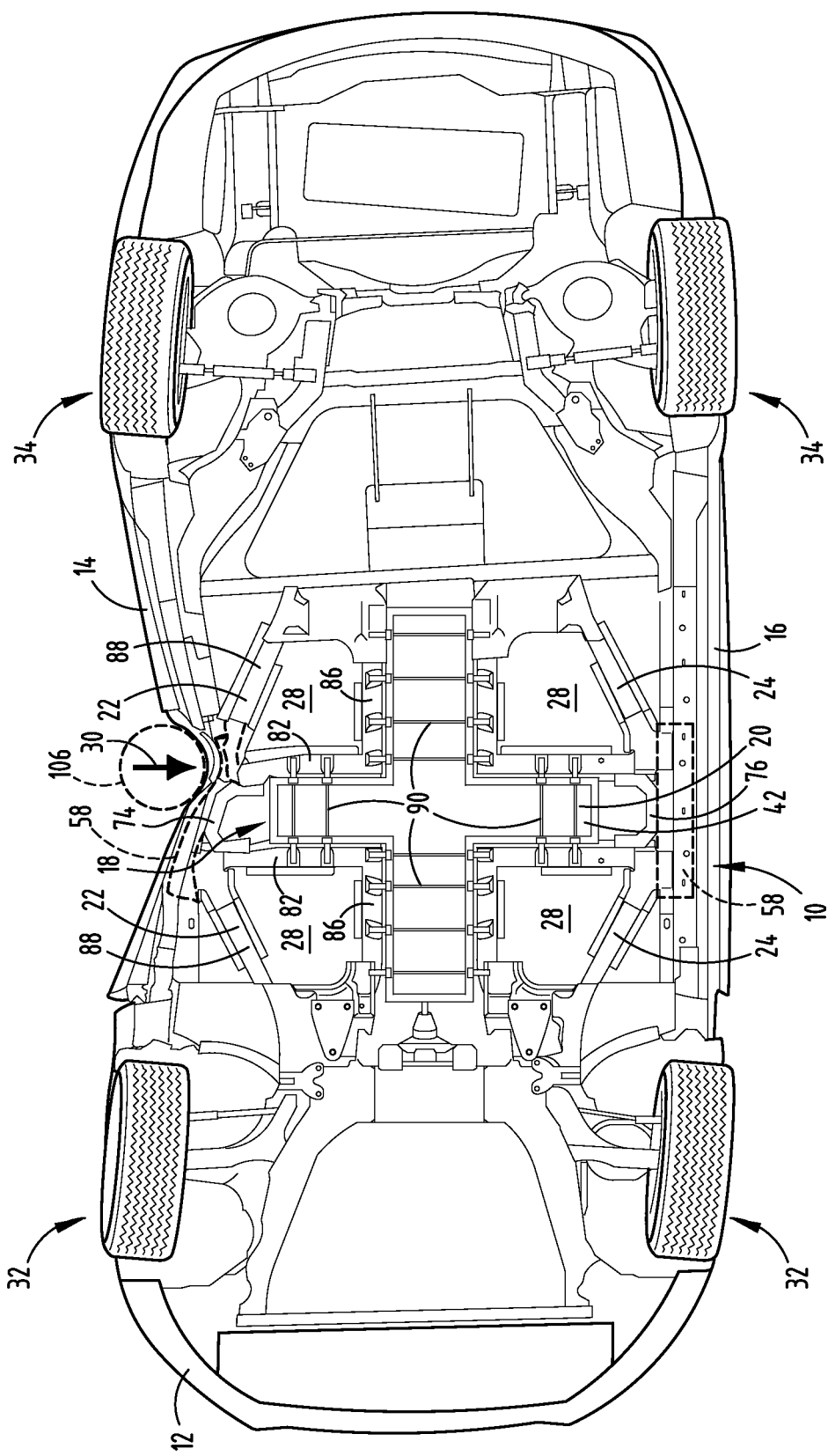
FIG. 8 is a bottom plan view of the underbody structure of the vehicle showing a side impact force from a pole applied to the underbody structure.

As shown in the embodiment illustrated in FIG. 8, the side impact force 30 is applied to the vehicle 12 with the vehicle 12 moving at approximately 20 miles per hour in the lateral direction prior to impact with a generally fixed pole 106 having a circular shaped cross-section. The illustrated embodiment reflects the resulting deformation to the vehicle 12 and the underbody structure 10 with the vehicle 12 decelerating to zero miles per hour upon receiving such an impact force 30. The side impact force 30 has been transmitted through the underbody structure 10 as described with reference to FIG. 7. As shown, the longitudinal rail 14 has been deformed inward and the crash element 58 has further been deformed to compress both crash chambers 96, 98. The impact force 30 has been transmitted through both lateral sections 82, 88 of the support member 22, whereby the inner lateral section 82 is deformed inward toward the lateral and longitudinal portions 40, 42 of the battery 20 and the angled lateral section 88 of the support member 22 is similarly deformed inward. It is understood that the illustrated deformation resulting from the side impact force 30 is one exemplary embodiment and that the side impact force 30 may have a myriad of characteristics, including magnitude, direction, impact location, geometry and weight distribution of impact object, and other conceivable variables.

Figure 8A:
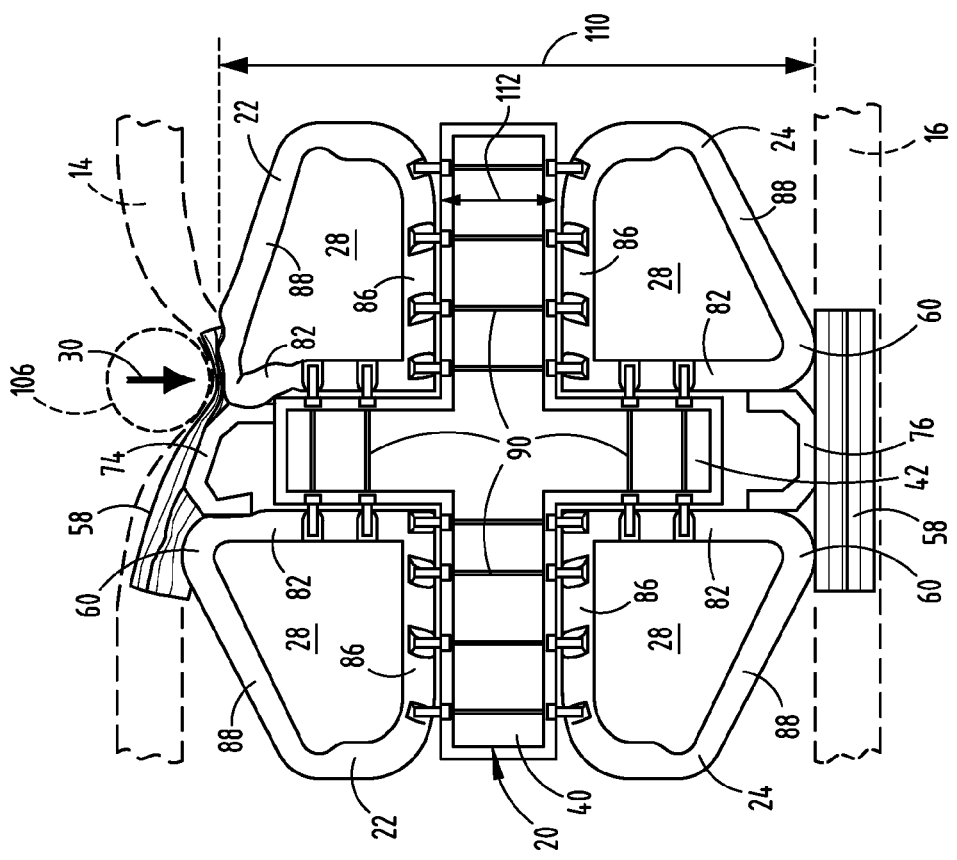
FIG. 8A is a bottom plan view of the underbody structure free of a side impact force.
Figure 8B:
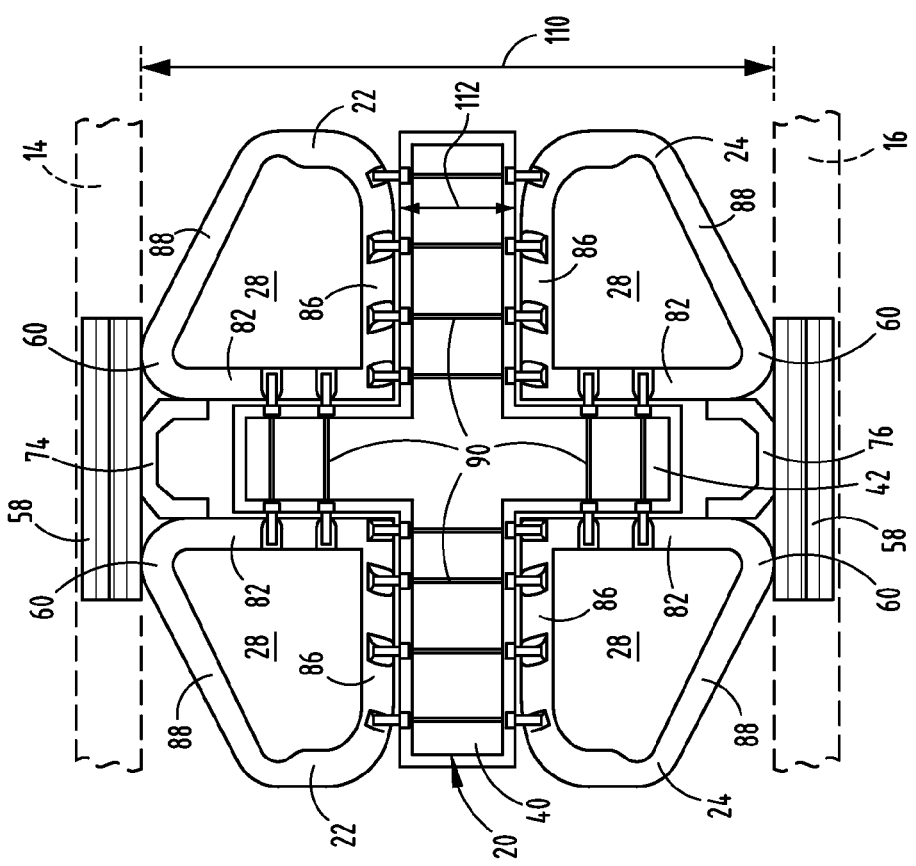
FIG. 8B is a bottom plan view of the underbody structure showing the side impact force, as illustrated in FIG. 8.
Figure 10:
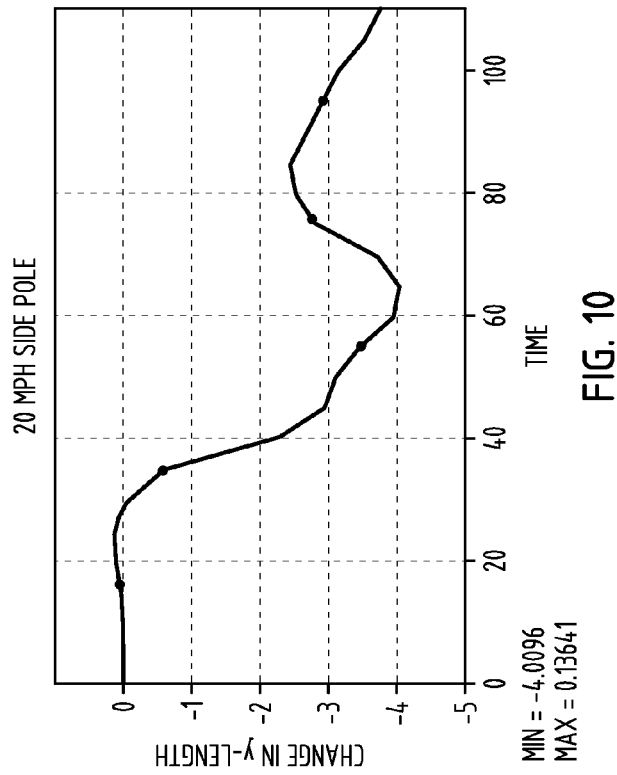
FIG. 10 is a graphical representation of the lateral distance of intrusion at a tunnel of the underbody structure resulting from the side impact force.
Figure 9:
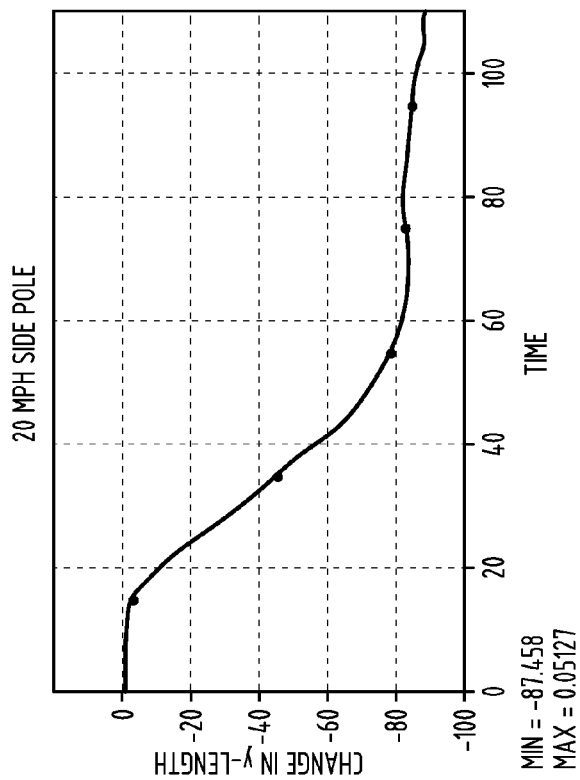
FIG. 9 is a graphical representation of the lateral distance of intrusion at a longitudinal rail resulting from a side impact force.

As shown in FIGS. 8-8A, a lateral distance 110 between the rails 14, 16 is decreased after the illustrated inward deformation due to the side impact force applied to the first rail 14. Upon experiencing the side impact force 30, the change in lateral distance 110 between the first and second longitudinal rails 14, 16 decreases approximately 87.5 mm upon experiencing such collision event. This change in lateral distance 110 between the rails 14, 16 is graphically depicted in FIG. 9 as a function of time to shown the change in lateral distance 110 slowed by the deformation occurring in the rail 14, crash element 58, bridging element 74, and support member 22. The resulting lateral deformation proximate the tunnel portion 38 of the housing 18 is similarly reflected in FIG. 10, showing a lateral distance 112 between the longitudinal sections 82 of the first and second pairs of support members 22, 24, before, during, after the collision event from the impact force 30. As illustrated, the maximum deformation of the lateral distance 112 between the longitudinal sections 82 of the first and second pairs of support members 22, 24 decreases 4 mm upon the illustrated collision event, such that the support members 22, 24 avoid contact with the battery 20. Accordingly, the impact force in the illustrated embodiment is substantially absorbed by the structure between the battery 20 and the rail 14. Further, the shape of the support members 22, 24 are configured such that even upon experiencing a greater impact force the support members 22, 24 may contact the battery 20 but the force of such a contact would be disbursed along the longitudinal section 82 of the support members 22, 24 and a large side surface of the battery 20. This force distribution further reduces the chances of intrusion or substantial damage to the battery 20. It is also understood that an impact force to the opposing lateral rail 16 would have similar deformation characteristics.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle underbody structure, comprising:
   a rail;
   a battery spaced inward from the rail; and
   a nonintrusive support member spanning between the battery and the rail, comprising:
     a longitudinal section that borders a side region of the battery; and
     a pair of lateral sections that extend from spaced locations on the longitudinal section laterally outward and longitudinally toward each other to adjoin proximate the rail, each lateral section defining a respective enclosed area.

2. The vehicle underbody structure of claim 1, further comprising:
   a vehicle floor coupled with an upper surface of the support member for supporting an occupant.

3. The vehicle underbody structure of claim 1, further comprising:
   a crash element coupled with the rail proximate the pair of lateral sections of the support member, wherein the crash element includes a tubular shape for absorbing the side impact force.

4. The vehicle underbody structure of claim 3, wherein the rail includes an inside member having a C-shaped cross section that extends the length of the rail, and wherein the inside member of the rail is coupled between the support member and the crash element.

5. The vehicle underbody structure of claim 4, wherein the rail includes an outside member extending in alignment with and coupled with the inside member to enclose the crash element.

6. The vehicle underbody structure of claim 1, further comprising
   a protective housing enclosing an upper portion of the battery, wherein the longitudinal section of the support member couples with the protective housing, and wherein the longitudinal and lateral sections of the support member define a hoop shape.

7. A vehicle underbody structure, comprising:
   a pair of longitudinal rails;
   a tunnel spaced between the longitudinal rails;
   a battery having a longitudinal portion disposed at least partially within the tunnel; and
   a nonintrusive support member spanning between the tunnel and one of the longitudinal rails and having a hoop shape that surrounds an enclosed area and that is adapted to deform into the enclosed area for preventing a side impact force from damaging the tunnel.

8. The vehicle underbody structure of claim 7, wherein the battery includes a lateral portion extending orthogonally from the longitudinal portion, and wherein the support member borders a side region of the lateral and longitudinal portions of the battery.

9. The vehicle underbody structure of claim 7, further comprising:
   a crash element coupled with the longitudinal rail proximate the support member for absorbing the side impact force.

10. The vehicle underbody structure of claim 7, wherein the longitudinal rail that is coupled the support member includes an interior volume and a crash element coupled within the interior volume for reinforcing the longitudinal rail proximate the support member.

11. The vehicle underbody structure of claim 7, wherein the hoop shape of the support member includes a longitudinal section that borders the tunnel and a pair of lateral sections that extend outward from opposing ends of the longitudinal section and adjoin adjacent to the longitudinal rail.

12. The vehicle underbody structure of claim 7, further comprising
a vehicle floor spanning between the pair of longitudinal rails and coupled with an upper surface of the support member for supporting an occupant.

13. A vehicle underbody structure, comprising:
first and second rails extending longitudinally;
a housing spaced between the first and second rails;
a battery disposed within the housing;
a first pair of support members spanning between the housing and the first rail; and
a second pair of support members spanning between the housing and the second rail, wherein the first and second pairs of support members each include a separate hoop shape with a central opening for absorbing a side impact force.

14. The vehicle underbody structure of claim 13, further comprising:
a crash element coupled within the first rail proximate the first pair of support member for absorbing the side impact force.

15. The vehicle underbody structure of claim 13, wherein the battery includes a longitudinal portion disposed within a tunnel area of the housing and a lateral portion extending orthogonally from opposite sides of the longitudinal portion to define a cross shape.

16. The vehicle underbody structure of claim 15, wherein the first and second pairs of support members are separated by the lateral portion of the battery.

17. The vehicle underbody structure of claim 15, further comprising:
a bridging element coupled with the first rail and extending between the first pair of support members to space the first pair of support members away from the lateral portion of the battery.

18. The vehicle underbody structure of claim 15, wherein the hoop shapes of the support members each includes a longitudinal section that borders the longitudinal portion of the battery, a central lateral section that extends outward from a first end of the longitudinal portion and borders the lateral portion of the battery, and a distal lateral section that extends outward from a second end of the longitudinal section and adjoins the central lateral section.

19. The vehicle underbody structure of claim 13, further comprising
a vehicle floor spanning between the first and second rails and coupled with an upper surface of the first and second pairs of support members for supporting an occupant.

* * * * *